J. PATRICK.
ELECTRICAL MEASURING INSTRUMENT.
APPLICATION FILED MAR. 2, 1911.

1,118,678.

Patented Nov. 24, 1914.
2 SHEETS—SHEET 1.

Witnesses:
Geo. C. Davison
Harold G. Barrett

Inventor
Joshua Patrick.
By G. L. Cragg
Atty

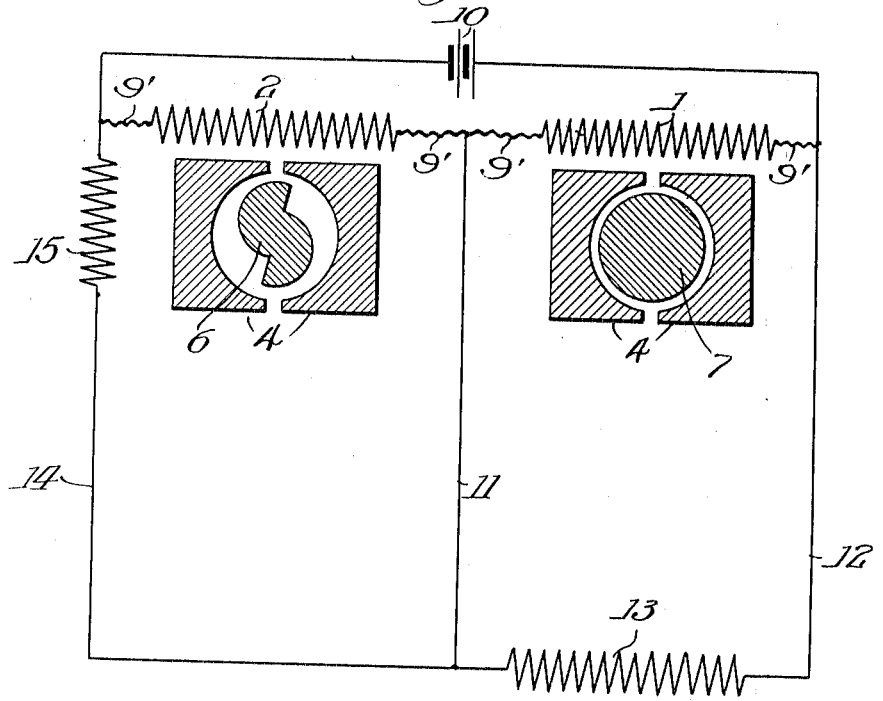
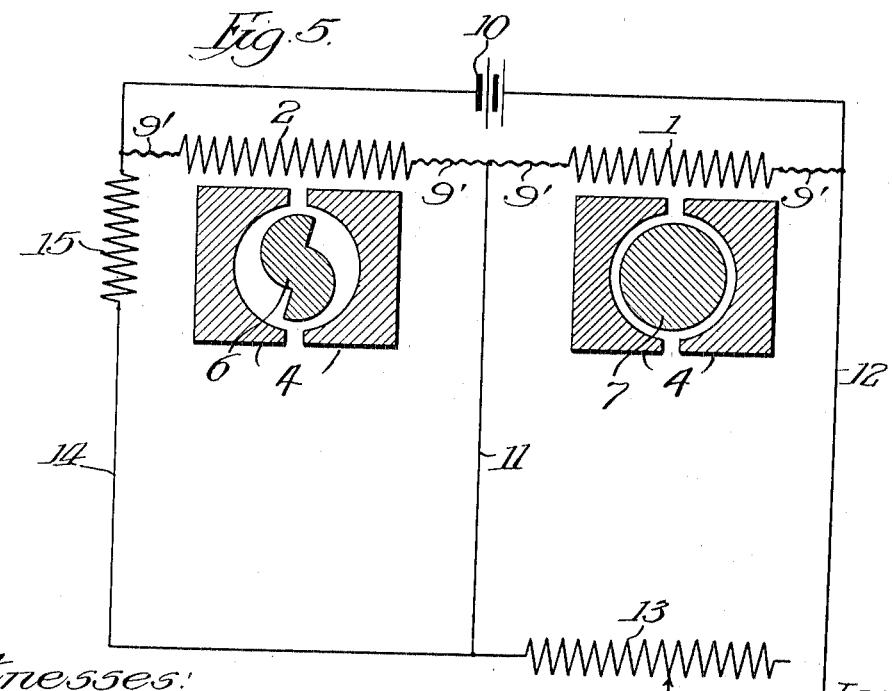

UNITED STATES PATENT OFFICE.

JOSHUA PATRICK, OF DETROIT, MICHIGAN.

ELECTRICAL MEASURING INSTRUMENT.

1,118,678. Specification of Letters Patent. Patented Nov. 24, 1914.

Application filed March 2, 1911. Serial No. 611,899.

*To all whom it may concern:*

Be it known that I, JOSHUA PATRICK, a citizen of the United States, residing at Detroit, in the county of Wayne and State of Michigan, have invented a certain new and useful Improvement in Electrical Measuring Instruments, of which the following is a full, clear, concise, and exact description, reference being had to the accompanying drawings, forming a part of this specification.

My invention relates to electrical measuring instruments and has for one of its objects the provision of electro-magnetic means for restoring the rotating or swinging elements of measuring instruments to normal when said elements have been relieved of the influence of deflecting or actuating torque whereby errors due to the mechanical action of restoring springs, as hitherto employed, are eliminated.

My invention is of particular service when embodied in those electrical measuring instruments that employ sources of current as a testing factor as variations in the voltage of the sources of current are prevented from introducing error and also from improperly modifying the restoring torque.

My invention in its various characteristics will be described by reference to the preferred embodiment thereof shown in the accompanying drawings in which—

Figure 1:
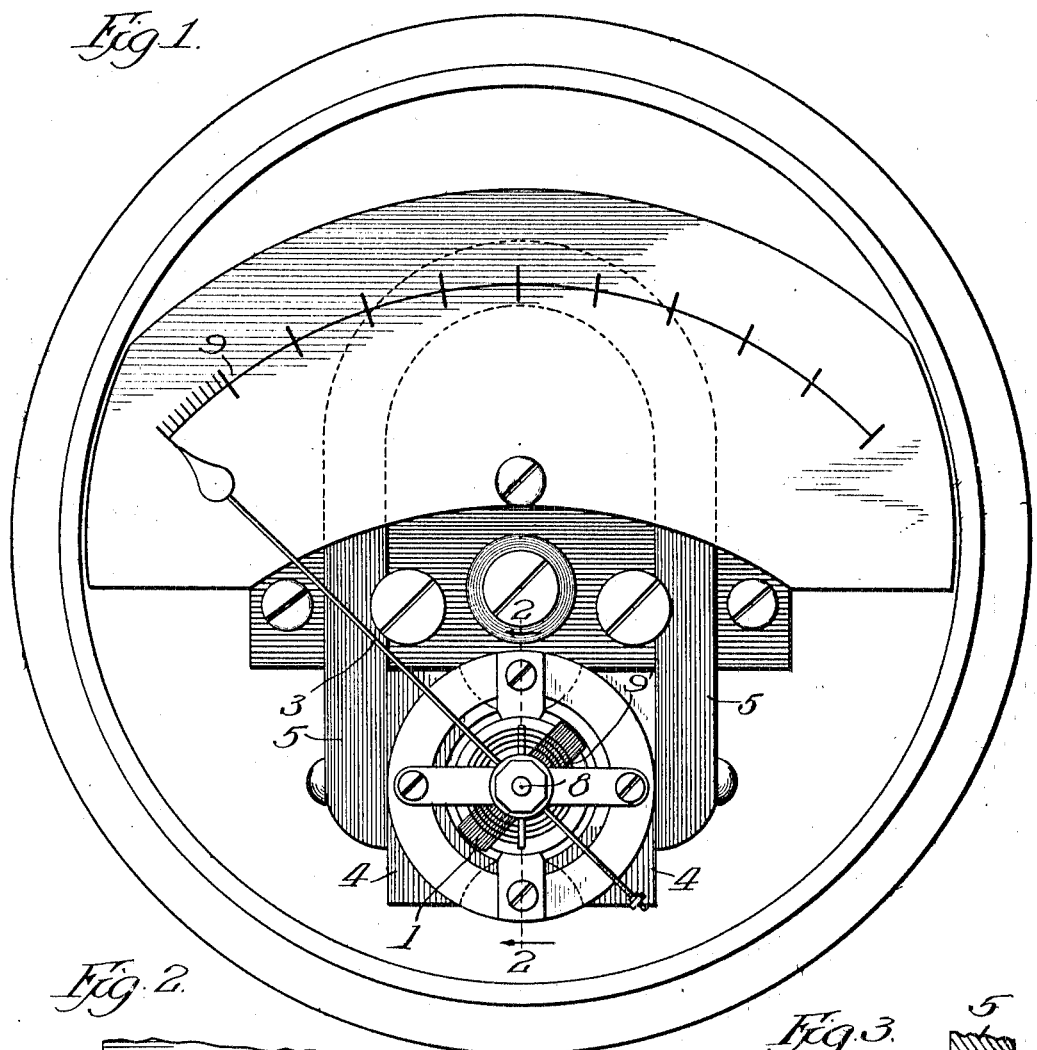
Figure 2:
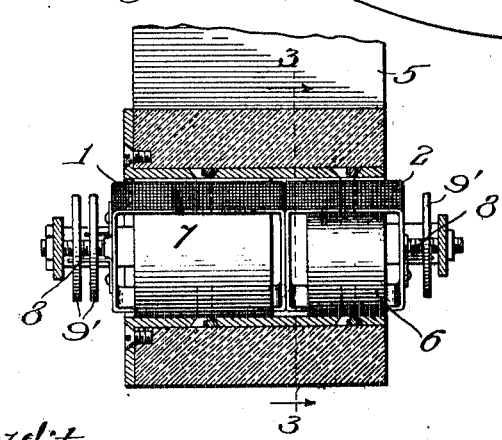
Figure 3:
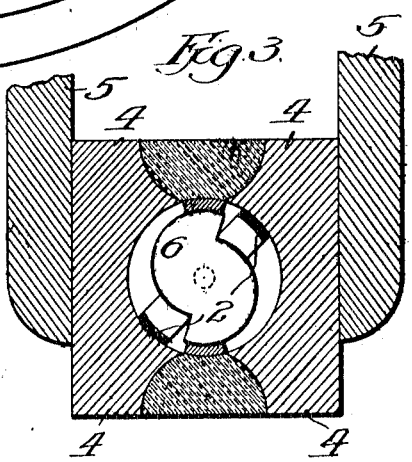

Figure 1 is a view in elevation, with certain parts removed for the sake of clearness, of the instrument constructed in accordance with my invention; Fig. 2 is a sectional view on line 2 2 of Fig. 1; Fig. 3 is a sectional view on line 3 3 of Fig. 2; Fig. 4 is a diagrammatic view illustrating the circuit arrangement that is preferred when the instrument is used as a pyrometer; Fig. 5 is a diagrammatic view illustrating the circuit arrangement that is preferred when the instrument is used as an ohm meter.

Like parts are indicated by similar characters of reference throughout the different figures.

The moving element of the instrument includes a needle deflecting coil 1 and a needle restoring coil 2 which are mechanically coupled and with respect to which an indicating needle 3 is fixed, these coils being alined longitudinally of their axis of movement which is the axis of movement of the indicating needle. These coils and the needle are mounted to swing or rotate about an axis that is common with the axis of a cylindrical bore formed mainly in the opposed faces of two pole pieces 4 that are included in the magnetic circuit of a permanent magnet 5. Stationary cores 6 and 7 are included within the circuit of the permanent magnet, the core 6 being surrounded by coil 2 and the core 7 by coil 1, these coils rotating in the spaces that intervene between the cores and the pole pieces. The core 6 coöperates with the permanent magnet to produce a magnetic field for the restoring coil, the density of which field increases in the direction of movement of the coil as compared with the field in which the deflecting or actuating coil 1 moves, the core 6 being shaped as illustrated for the purpose stated while the core 7 is desirably cylindrical and concentric with the axis of the bore in which it is operated for the purpose stated, the field through which this latter coil moves being thus made uniform, as is preferred. Any suitable bearings may be employed for the swingingly mounted coils, bearing structures being illustrated at 8, Figs. 1 and 2. The scale 9, over which the index end of the needle 3 is adapted to sweep, is spaced off in divisions to suit its purpose and association. When current flows through the coil 2 the needle 3 is swung to the right in opposition to a counter torque due to the reaction between current in the restoring coil 1 and the magnetic field in which this coil moves, the restoring torque increasing as the movement of the needle from rest continues whereby the function of restoring springs is performed without their employment. As it is desired to eliminate as far as possible mechanical opposition to the movement of the needle 3 and coils 1 and 2, the conductors $9^1$ that connect the coils 1 and 2 in circuit are made very flexible and with minimum resilience, these conductors being desirably spirally disposed in planes parallel with the plane of movement of the coils further to eliminate mechanical opposition to the movement of the needle and coils.

I will now refer to that embodiment of my invention diagrammatically illustrated in Fig. 4, which is preferably employed when included in a pyrometer. The coils 1 and 2, which are desirably of high resistance say 250 ohms each, are included in serial relation with each other and with a source of electro-motive force 10, such as a battery. Conductors 11 and 12 connect the resistance 13 in parallel with the deflecting or actuating coil 1, the element 13 being made of material whose resistance will change in conformity with the heat to which said element is subjected, as is well understood by those skilled in the art of pyrometers. A conductor 14 includes a resistance 15 in parallel with the restoring coil 2. The resistances 13 and 15 may, for example, measure 45 ohms each. While the resistance 13 is directly in shunt of the actuating coil 1 and the resistance 15 is directly in shunt of the restoring coil 2, both resistances are in series with each other and with the source of current 10. When the resistance of the element 13 is varied by changing the temperature to which said element is subjected, current in the actuating coil 1 will be varied in the same proportion, while current through restoring coil 2 and resistance 15 will remain practically the same whereby a deflection of the moving element is produced that corresponds with the change of resistance in the element 13. When the instrument is used as a pyrometer the conductors 14 and 11 are connected very near one terminal of the resistance element 13, and as the conductors 11, 12 and 14 are made of the same size and kind of wire no error is introduced since any change in resistance due to the change in heat to which either of the conductors 11, 12 and 14 is subjected will be accomplished by corresponding change in the remainder of these conductors owing to the close proximity of these conductors.

As the instrument is preferably embodied, the magnetic field in which the coil 2 moves increases in density in direct proportion to the deflection of the moving element, thus increasing the torque in a backward direction in the same proportion, while coil 1 is mounted in a practically uniform magnetic field whereby an actuating or deflecting torque is produced upon the moving element that is proportionate to the increase of current flowing in coil 1 over the current flowing in coil 2, whereby a forward torque will become effective upon the moving element to turn it forwardly against the torque due to the restoring coil 2, which increases in direct proportion to the deflections, this forward torque being effective to actuate the moving element until the forward and backward torques are equalized. It is apparent that any increase or decrease of the voltage at 10, within reasonable limits, will be accompanied by a corresponding change in the torque due to both coils 1 and 2, whereby the index needle 3 will be permitted to perform its function properly, as the deflection is not dependent upon the amount of current flowing through the coils but is dependent upon the relative difference between the currents in coil 1 over coil 2, a result which would not follow if restoring springs were employed in connection with an instrument, and a battery whose voltage is permitted to change.

I am aware that it is old to cause the deflecting coil to move in a magnetic field that decreases from the zero position of the needle and to cause the restoring coil to move in a magnetic field which is substantially constant. Such an instrument is disclosed in British Patent No. 7,398 of 1908. Instruments of the kind disclosed in said British patent have very restricted ranges of operation, their needles being, in practice, limited to ranges of movement approximating 45°. I, by causing the restoring coil to move in an increasing field and the deflecting coil to move in a substantially constant field, am enabled to secure a range of operation greatly in excess of that which is secured by the instrument of the British patent, and though the instrument which I have specifically disclosed has a range of operation of 90°, yet, it is apparent that such range may be considerably exceeded.

By the circuit arrangement and construction illustrated not only does the accuracy of the readings not depend on the strength of the fields in which the coils move and upon the constancy of the voltage applied, but the variations in temperature to which the electric conductors in the mechanism of the meter are subject will not vary the accuracy of the meter readings. The instrument can be calibrated to measure very high or low temperatures and resistances The circuit arrangement shown in Fig. 5 is generally similar to the circuit arrangement illustrated in Fig. 4, and similar parts are given similar characters of reference. The resistance to be measured is in the form of a rheostat or mechanically varied resistance, a switch arm or variable contact member 16 being diagrammatically indicated for varying the amount of the element 13 that is included in circuit.

It will be seen that the instrument of my invention is of particular service in connection with the uses to which it has been put as described with reference to Figs. 4 and 5, but I do not wish to limit myself to the adaptations of my instrument shown in these latter figures.

While I have herein shown and particularly described the preferred embodiment of my invention, I do not wish to be limited to the precise details of construction shown and specifically described as changes may readily be made without departing from the spirit of my invention.

Having thus described my invention, I claim as new and desire to secure by Letters Patent the following:—

1. A measuring instrument including mechanically coupled rotatably mounted indicator actuating and restoring coils which are alined and having a common axis; an indicating device operated by the actuating coil; and means for producing magnetic field portions individual to said coils and in which said coils move and for causing the density of the field portion in which the restoring coil moves to increase in the direction of forward movement of the coils.

2. A measuring instrument including mechanically coupled rotatably mounted indicator actuating and restoring coils which are alined and having a common axis; an indicating device operated by the actuating coil; and means for producing magnetic field portions individual to said coils and in which said coils move and for causing the field portion in which the restoring coil moves to increase in density in the direction of forward movement of the coils, the field portion in which the actuating coil moves being substantially uniform.

In witness whereof, I hereunto subscribe my name this 21st day of February A. D., 1911.

JOSHUA PATRICK.

Witnesses:
 THOMAS P. BRANNIGAN,
 Mrs. H. RICHARDSON.